March 16, 1971 ISAMU. NAKADAIRA 3,570,318

TURNTABLE ROTATING SPEED CHANGING DEVICE

Filed Oct. 16, 1969 2 Sheets-Sheet 1

INVENTOR.
Isamu Nakadaira
BY Holman, Glascock, Downing & Seebold
ATTORNEYS

TURNTABLE ROTATING SPEED CHANGING DEVICE

Filed Oct. 16, 1969 2 Sheets-Sheet 2

INVENTOR.
Isamu NAKADAIRA
BY Holman, Glascock, Downing & Seebold
ATTORNEYS

1

3,570,318

TURNTABLE ROTATING SPEED CHANGING DEVICE

Isamu Nakadaira, Yokohama, Japan, assignor to Victor Company of Japan, Limited, Yokohama, Japan Filed Oct. 16, 1969, Ser. No. 866,912
Claims priority, application Japan, Oct. 19, 1968, 43/90,834
Int. Cl. F16h 7/08
U.S. Cl. 74—242.3 7 Claims

ABSTRACT OF THE DISCLOSURE

A turntable rotating speed changing device comprising an operation lever member to turn in a horizontal plane parallel to a motor board and a belt shifting lever member for the preferential change of rotation speed of a turntable driven by a belt. The latter shifting lever member is transmitted the turning force of said operation lever member converted of its turning plane, and turned in a plane vertical to said motor board to shift the belt upwardly or downwardly between on steps of a multi-stepped pulley.

This invention relates to a device for changing the rotating speed of a turntable and more particularly to a device in a record player of a belt-driven type for changing the rotating speed of a turntable by shifting a position of a belt from a step to another on a multi-stepped pulley in the course of running of the belt.

In order to change the rotating speed of the turntable of the belt-driven type record player which is rotated by running of the belt wound on the outer periphery rim of the turntable being mounted a record disc thereon, it has been general to shift a position of the belt from upper to lower or from lower to upper on the stepped pulley portions, of the multi-stepped pulley having different diameters and driven by a motor. In the turntable rotating speed changing device of this kind it was known to use an operation means such as a see-saw lever means or a push button means so as to be manually operated upwardly and downwardly.

The described rotating speed changing operation means in the conventional mechanism had ordinarily a construction designed to operate by the force of a vertical direction same as the direction of movement of a belt shifting and involved a disadvantage in that when the speed changing operation means is operated a motor board is affected by the force of the vertical direction and this caused vibrations in the motor board particularly when said changing operation means is provided on a floating motor board carried by springs. When reproducing play of a record disc is started while the motor board is vibrating it is not available to ensure a good performance of the reproducing, therefore it is required to wait until the vibration of the motor board is lessened before the play performance is started. Or otherwise it is required to stop manually the vibration at once. There was another disadvantage that an attempt for a novel design of the operation means of the record player was greatly obstructed by its construction and excellent design could not be obtained.

The present invention intends to remove these disadvantages in the record player by providing an operation means which is so designed as to be provided a force from the outside directly in the horizontal and parallel plane to the motor board.

The principal object of the present invention is to provide a turntable rotating speed changing device capable of being easily operated through an extremely simple mechanism without any vibrations to vibrate upwardly

2 and downwardly a motor board rotatably mounted a turntable thereon.

Other object of the present invention is to provide a rotating speed changing device having a construction in which a shifting of a position of a belt on a pulley is made by a manual operation in a plane parellel to the motor board to effectively change the rotating speed of a turntable.

Still other object of the present invention is to provide a rotating speed changing device for a turntable in which a manual operation in a horizontal plane can be converted into a belt shifting operation in a vertical plane by means of a very simple construction.

Other objects and advantages of the present invention will be apparent from the following description when the reference is made to the accompanying drawings, in which.

Figure 1:
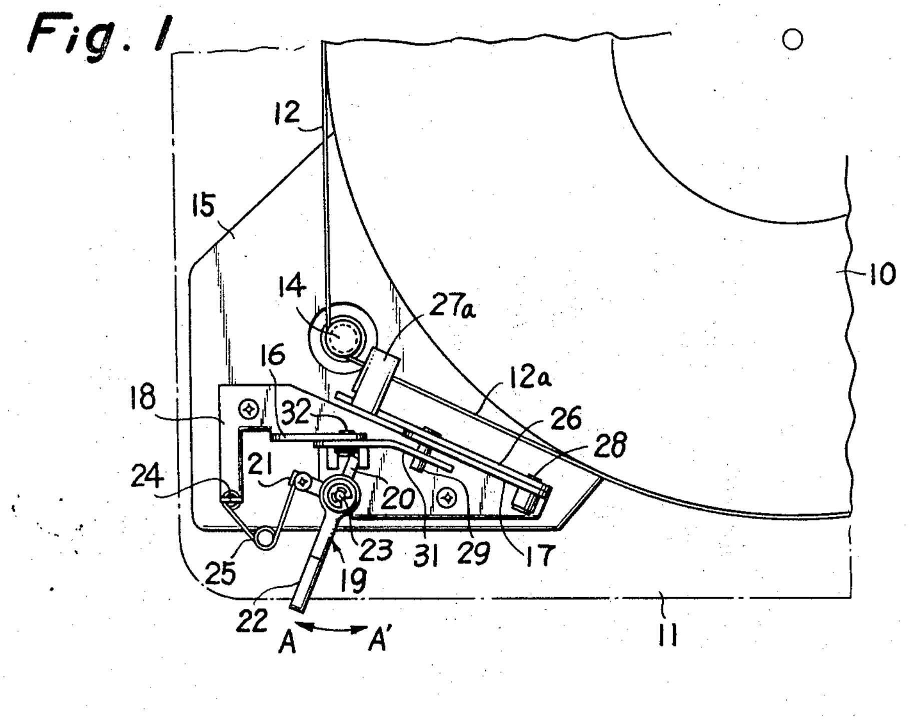
FIG. 1 is a plan view of an embodiment of the rotating speed changing device according to the invention.
Figure 2:
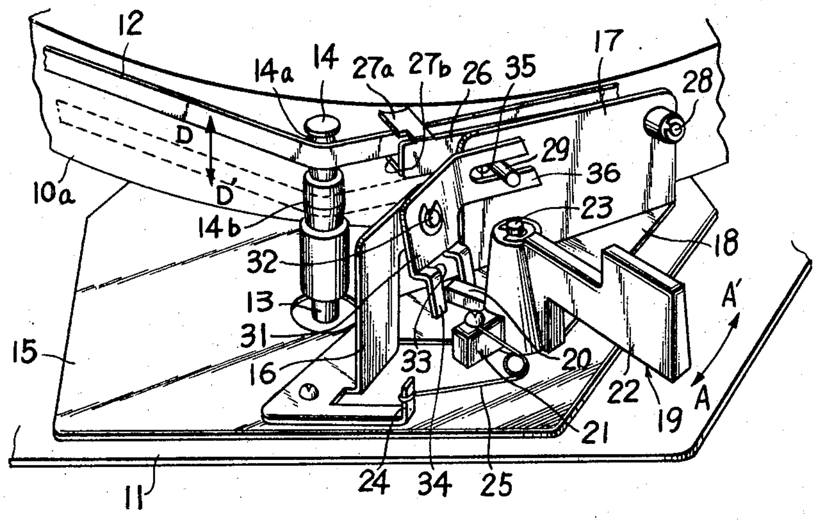
FIG. 2 is a perspective view of the device viewed from the left and forward direction.
Figure 3:
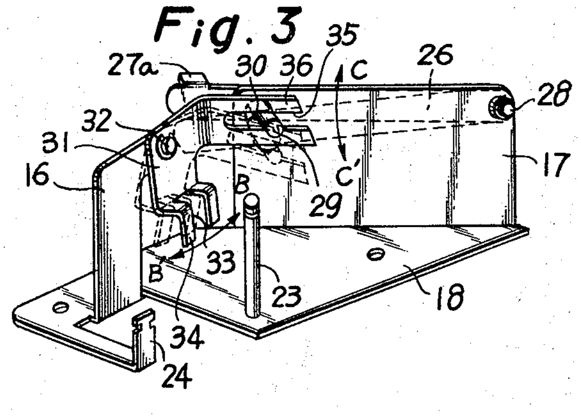
FIG. 3 is a perspective view of an essential part of the device.

FIG. 1 through FIG. 3 show respectively the first embodiment of the device according to the invention. A turntable 10 for mounting a record disc is provided rotatably on a motor board 11 having a mounting plate 15 fixed a motor (not shown) thereunder. The outer peripheral of the rim 10*a* of the turntable 10 is wound around a belt 12 for driving the turntable. The belt 12 is wound around in less than one round of the rim 10*a* of the turntable 10, prevented of slipping therebetween. Said belt 12 is further wound in contact on a multi-stepped pulley 14 provided at the upper portion of a shaft 13 of said motor. By rotation of the pulley 14 driven by rotation of the motor correspondingly the belt 12 is run and rotates the turntable 10. In this embodiment, said pulley 14 consists of a small diameter pulley portion 14*a* for 33 r.p.m. rotation of a turntable and a large diameter pulley portion 14*b* for 45 r.p.m. rotation of the turntable in a form of a two-stepped pulley.

One a mounting plate 15 is attached a bracket 18 having first and second vertically erected portions 16 and 17. The vertical portion 17 is disposed in parallel with a rectilinear portion 12*a* of the belt 12 between the pulley 14 and the turntable 10. There is pivoted an operation lever 19 having projections 20 and 21 at the lower part and an operation knob 22 at the upper part. The lever 19 is capable of turning in a horizontal plane parallel to the motor board 11 and about a shaft 23 vertical to the bracket 18. Between the projection 21 and a projection 24 of the bracket 18 is provided a toggle spring 25 to definitely regulate the turning of the lever 19.

A select lever 26 for shifting the belt 12 and changing a rotating speed of the turntable 10 has belt shifting portions 27*a* and 27*b* at its rotating free end to shift the belt 12 upwardly and downwardly on the pulley 14. The other end of the lever 26 is attached turnably on a shaft 28 at the vertical portion 17. A stud 29 provided on the select lever 26 is loosely fitted to an elongated slot 30 formed on the vertical portion 17. The lever 26 can move upwardly and downwardly in the range defined by a movement of the stud 29 along the slot 30. When the lever 26 is turned upwardly in position the belt 12 between the belt shifting portions 27*a* and 27*b* is shifted onto the upper pulley portion 14*a* and as the lever 26 is turned downwardly in position said belt 12 between the shifting portions 27*a* and 27*b* is shifted onto the lower pulley portion 14*b*. A select arm 31 of an approximately L-shape is turnable about a shaft 32 at the vertical portion 16 and has an arm end 34 which has a U-shaped recess 33 in engagement with the projection 20 of the lever 19 and an arm end 36 which has a U-shaped recess 35 in engagement with the stud 29 of the lever 26.

In operation, the knob 22 of the operation lever 19 is turned in the direction of an arrow A as shown in FIG. 1, whereupon the projection 20 of the lever 19 fits to the recess 33 to thereby retain the select arm 31 turned in the direction of an arrow B as shown by a full line in FIG. 3. Then by the stud 29 engaging with the recess 35 at an arm end 36 of the arm 31, the select lever 26 is retained at a position turned in the direction of an arrow C as shown in FIG. 2. The belt 12 is moved upwardly in the direction of an arrow D by the belt shifting portion **27*b* so that it is applied on the small diameter pulley portion 14*a*. Therefore as the pulley 14 is rotated the belt 12 is driven to run by the pulley portion 14*a* and the turntable 10** is rotated at a speed of 33 r.p.m.

The upper limit of the movement of the lever 26 is defined by the engagement of the stud 29 with the upper end of the slot 30, during which the operation lever 19 is retained at the turned position by the toggle spring 25 as previously mentioned. Thus all members are retained in the above described positions and the belt 12 is retained in a condition being applied on the pulley portion **14*a***.

Operations for changing the rotating speed of the turntable 10 to a speed of 45 r.p.m. is described below. If the knob 22 of the lever 19 is turned in the direction of an arrow A′ in the horizontal plane parallel to the motor board 11, the arm end 34 of the arm 31 engages with the projection 20 and turns in the direction of an arrow B′ to a position shown by a broken line in the vertical plane relative to the motor board 11. Subsequently, the arm end 36 of the arm 31 turns to a position as shown by a broken line and turns the lever 26 through the stud 29 in the direction of an arrow C′ in the vertical plane relative to the motor board 11. With the downward turning of the lever 26 the belt shifting portion **27*a* shifts the belt 12 downward in the direction of an arrow D′, which in turn is put on the large diameter pulley portion 14*b* as shown by a broken line in FIG. 2. As the pulley 14 is rotated by the motor accordingly, the belt 12 is driven to run by the pulley portion 14*b* with the result that the turntable 10** is rotated at a speed of 45 r.p.m.

The lower limit of the movement of the lever 26 is defined by the engagement of the stud 29 with the lower end of the slot 30. The operation lever 19 is imparted a definite regularity in turning by force of the toggle spring 25. The lever 19 then is carried in a position turned as described above by the spring 25 and the belt 12 is retained in a position applied on the pulley portion **14*b***.

For changing over the rotating speed of the turntable 10 from 45 r.p.m. to 33 r.p.m. the knob 22 of the lever 19 may be turned in the direction of the arrow A. Thereupon all members will operate reversely in the direction relative to the previously mentioned operation. Therefore the arm 31 turns in the direction of the arrow B, the lever 26 turns in the direction of the arrow C and the belt 12 shifts upwardly in the direction of the arrow D and is put on the pulley portion **14*a***.

It will be seen that by turning the knob 22 of the operation lever 19 in the horizontal plane parallel to the motor board 11 the lever 26 can move in a plane vertical to the motor board 11 and the belt 12 is shifted preferentially upwardly or downwardly relative to the pulley 14 through the simple mechanisms.

Figure 4:
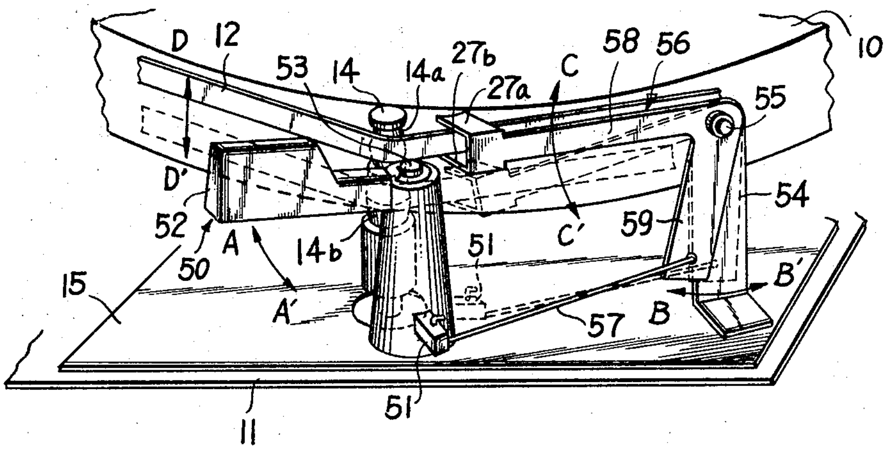
FIG. 4 is a plan view of other embodiment of the device according to the present invention.

FIG. 4 is a perspective view of the second embodiment of the device according to the invention. The like numerals in the embodiment designate the like parts in the first embodiment.

An operation lever 50 has a projection 51 at the lower part and an operation knob 52 at the upper part thereof. The lever 50 is provided to turn about a shaft 53 on the mounting plate 15. A select lever 56 of an approximately L-shape is provided on a shaft 55 of a bracket 54 vertically fixed on the mounting plate 15 and has the belt shifting portion **27*a* and 27*b* at the forward end of a lever arm 58. Between an end of a lever arm 59 of the lever 56 and the projection 51 is provided a connecting rod 57**.

As shown by a full line in the figure, in which the knob 52 is turned in the direction of an arrow A, and the projection 51 is in a position as shown by a full line. The lever arm 59 is pulled by the connecting rod 57 and located in a position turned in the direction of an arrow B. Accordingly, the lever arm 58 is in a position turned in the direction of an arrow C with the belt 12 being shifted upwardly in the direction of an arrow D by the belt shifting portion **27*b*. Thus the belt 12 is applied on the small diameter pulley portion 14*a* and the turntable 10** is rotated at the speed of 33 r.p.m.

To change the rotating speed of the turntable 10 the knob 52 of the lever 50 is turned in the direction of an arrow A′ in the horizontal plane parallel to the motor board 11. By turning of the lever 50 the projection 51 pushes the rod 57 and turns to a position shown by a broken line in the figure. The lever arm 59 of the lever 56 is pushed by the rod 57 and turned to a position as shown by a broken line in the direction of an arrow B′. With this operation the lever arm 58 is moved to a position shown by a broken line in the direction of an arrow C′ in the plane vertical to the motor board 11. The belt 12 is pushed by the belt shifting portion **27*a* and shifted downward to a position shown by a broken line in the direction of an arrow D′. Therefore, the belt 12 is put on the large diameter pulley portion 14*b* and the turntable 10** is rotated at a speed of 45 r.p.m.

If the rotating speed of the turntable 10 is to be changed from 45 r.p.m. to 33 r.p.m., the knob 52 may be turned in the arrow direction A whereby all members will move in the reverse direction. The belt 12 is shifted upwardly again to be applied on the pulley portion **14*a***.

Throughout the embodiments as hereinbefore described, the pulley 14 is constituted respectively of two-stepped pulley portions **14*a* an 14*b*** for the rotating speeds of 33 r.p.m. and 45 r.p.m. but it may be desirably formed in three or more steps including steps for the rotating speeds of 16 r.p.m. or 78 r.p.m.

While the invention has been described with respect to the specific and preferable embodiments, various modifications and variations thereof will be apparent to those skilled in the art without departing from the scope of of the invention which is set forth in the appended claims.

What I claim is:

1. A turntable rotating speed changing device comprising a motor board having a turntable rotatable thereon, an operation lever member pivoted to turn in a plane parallel to said motor board, a belt shifting lever member pivoted to turn in a plane vertical to said motor board, a means for transmitting the turning of said operation lever member to said belt shifting lever member by converting its turnable plane, a multi-stepped pulley having portions of different diameters in plural steps, and the belt applied on said pulley and said turntable, wherein said belt shifting lever member has a shifting portion at its free rotary end to engage with and shift said belt.

2. A turntable rotating speed changing device according to claim 1 wherein said belt is wound around said pulley and an outer periphery of a rim of said turntable, and each pulley portion of said multi-stepped pulley is preferentially adapted for the diameters so as to rotate said turntable respectively at different and predetermined rotating speeds.

3. A turntable rotating speed changing device according to claim 1 which includes a turning plane converting arm member formed approximately in a L-shaped and adapted to turn in a plane vertical to said motor board, said arm member having an arm and engaging with a projection on said operation lever and an arm end engaging with said belt shifting lever member.

4. A turntable rotating speed changing device according to claim 3 wherein said belt shifting lever member is provided turnably on an erected bracket member vertical to said motor board and has a stud member fitted to a slot on said erected bracket member, said turning plane converting arm member being in engagement with said stud member.

5. A turntable rotating speed changing device according to claim 4 wherein said slot defines the area of movement of said stud member and defines the turning range of said belt shifting lever permitting said belt to shift between pulley portions of said multi-stepped pulley.

6. A turntable rotating speed changing device according to claim 1 wherein said means for transmitting the turning includes a connecting rod member for connecting a projection on said operation lever member with a rotary free end of said belt shifting lever member.

7. A turntable rotating speed changing device according to claim 1 wherein a toggle spring is provided between said operation lever member and a fixing portion.

References Cited

UNITED STATES PATENTS

| | | | |
|---|---|---|---|
| 2,504,529 | 4/1950 | Isom | 74—242.4 |
| 3,109,316 | 11/1963 | Louzil | 74—242.3 |
| 3,303,711 | 2/1967 | Karecki et al. | 74—242.3 |

LEONARD H. GERIN, Primary Examiner

UNITED STATES PATENT OFFICE

CERTIFICATE OF CORRECTION

Patent No. 3,570,318 Dated March 16, 1971

Inventor(s) Isamu Nakadaira

It is certified that error appears in the above-identified patent and that said Letters Patent are hereby corrected as shown below:

Column 3, line 15, cancel "2" and insert -- 3 --. Column 4, line 11, "A" should read -- As --; line 11, "in whi should read -- when --; line 12, cancel "and".

Signed and sealed this 1st day of June 1971.

(SEAL)
Attest:

EDWARD M.FLETCHER,JR.
Attesting Officer

WILLIAM E. SCHUYLER,
Commissioner of Paten